(12) United States Patent
Bishop

(10) Patent No.: US 12,313,423 B1
(45) Date of Patent: May 27, 2025

(54) DYNAMIC LOCALIZED MEDIA SYSTEMS AND METHODS

(71) Applicant: ChariTrek, Inc., Deer Park, WA (US)

(72) Inventor: Grant Bishop, Spokane, WA (US)

(73) Assignee: ChariTrek, Inc., Deer Park, WA (US)

(*) Notice: Subject to any disclaimer, the term of this patent is extended or adjusted under 35 U.S.C. 154(b) by 0 days.

(21) Appl. No.: 17/403,718

(22) Filed: Aug. 16, 2021

Related U.S. Application Data

(63) Continuation of application No. 14/613,239, filed on Feb. 3, 2015, now Pat. No. 11,112,265.

(60) Provisional application No. 61/935,003, filed on Feb. 3, 2014.

(51) Int. Cl.
*G01C 21/36* (2006.01)
*H04M 3/493* (2006.01)
*H04W 4/02* (2018.01)

(52) U.S. Cl.
CPC ......... *G01C 21/3679* (2013.01); *H04M 3/493* (2013.01); *H04W 4/02* (2013.01)

(58) Field of Classification Search
CPC ..... G01C 21/3679; H04M 3/493; H04W 4/02
See application file for complete search history.

(56) References Cited

U.S. PATENT DOCUMENTS

| | | | |
|---|---|---|---|
| 5,931,888 A | 8/1999 | Hiyokawa | |
| 6,741,864 B2 | 5/2004 | Wilcock et al. | |
| 7,096,120 B2 | 8/2006 | Hull | |
| 7,668,536 B2 | 2/2010 | Hull | |
| 8,306,641 B2 | 11/2012 | Jonsson | |
| 8,406,791 B1 | 3/2013 | Daily et al. | |
| 8,768,613 B2 | 7/2014 | Bamba | |
| 9,414,105 B2 * | 8/2016 | Rajapakse | ........ H04N 21/41407 |
| 11,112,265 B1 | 9/2021 | Bishop | |
| 2002/0077936 A1 | 6/2002 | Wiese | |
| 2004/0004663 A1 | 1/2004 | Kahn et al. | |
| 2004/0030491 A1 * | 2/2004 | Hull | ...................... H04W 4/024 701/433 |

(Continued)

OTHER PUBLICATIONS

Non-Final Office Action, Co-Pending U.S. Appl. No. 14/613,239, mailed Feb. 8, 2017, 9 pages.

(Continued)

*Primary Examiner* — Matthew J. Reda
(74) *Attorney, Agent, or Firm* — Perkins Coie LLP

(57) ABSTRACT

Dynamic localized media experiences are generated by a computer system after receiving a user input to define a plurality of geographic zones that that each include computer-readable data representing a corresponding physical geographic area. Multiple non-ordered physical geographic areas are represented by the plurality of geographic zones. The computer system accesses localized media experiences that each include media data configured for output to a computing device associated with a user, and links a different set of the localized media experiences to each of the plurality of geographic zones. The computer system defines, for each of the plurality of geographic zones, a respective criterion by which a localized media experience in the set of localized media experiences linked to the geographic zone is selected for provision to the user when the user is located within the physical geographic area corresponding to the geographic zone.

20 Claims, 15 Drawing Sheets

(56) References Cited

U.S. PATENT DOCUMENTS

| | | | |
|---|---|---|---|
| 2004/0132467 A1* | 7/2004 | Hull | H04L 67/12 |
| | | | 455/458 |
| 2005/0060299 A1 | 3/2005 | Filley et al. | |
| 2006/0026184 A1 | 2/2006 | Hewing et al. | |
| 2006/0089792 A1 | 4/2006 | Manber et al. | |
| 2006/0095540 A1 | 5/2006 | Anderson et al. | |
| 2006/0265491 A1* | 11/2006 | Litwin | H04W 4/029 |
| | | | 709/224 |
| 2006/0287813 A1* | 12/2006 | Quigley | G01S 5/0236 |
| | | | 701/533 |
| 2007/0115347 A1 | 5/2007 | Yim | |
| 2007/0123308 A1 | 5/2007 | Kim et al. | |
| 2007/0198495 A1 | 8/2007 | Buron et al. | |
| 2008/0033903 A1 | 2/2008 | Carol et al. | |
| 2008/0033935 A1 | 2/2008 | Frank | |
| 2008/0062940 A1* | 3/2008 | Othmer | H04W 4/20 |
| | | | 370/278 |
| 2008/0086356 A1 | 4/2008 | Glassman et al. | |
| 2008/0133599 A1 | 6/2008 | Stewart et al. | |
| 2008/0147730 A1 | 6/2008 | Lee et al. | |
| 2008/0226130 A1 | 9/2008 | Kansal et al. | |
| 2008/0285886 A1 | 11/2008 | Allen | |
| 2009/0006336 A1 | 1/2009 | Forstall et al. | |
| 2009/0303036 A1* | 12/2009 | Sahuguet | G06F 16/434 |
| | | | 340/539.13 |
| 2009/0328087 A1 | 12/2009 | Higgins et al. | |
| 2010/0030806 A1 | 2/2010 | Kuhlke et al. | |
| 2010/0045518 A1 | 2/2010 | Lee et al. | |
| 2010/0063726 A1 | 3/2010 | Marjenberg et al. | |
| 2010/0120450 A1* | 5/2010 | Herz | H04L 67/75 |
| | | | 455/456.3 |
| 2010/0223346 A1* | 9/2010 | Dragt | H04M 3/493 |
| | | | 715/745 |
| 2010/0259641 A1 | 10/2010 | Fujimoto | |
| 2011/0044563 A1 | 2/2011 | Blose et al. | |
| 2011/0129120 A1 | 6/2011 | Chan | |
| 2011/0173565 A1 | 7/2011 | Ofek et al. | |
| 2011/0184636 A1 | 7/2011 | Rolf et al. | |
| 2012/0136566 A1* | 5/2012 | Bamba | G01C 21/343 |
| | | | 701/410 |
| 2012/0235812 A1 | 9/2012 | Maia et al. | |
| 2012/0302255 A1 | 11/2012 | Wang et al. | |
| 2013/0110633 A1 | 5/2013 | Waldman et al. | |
| 2013/0178961 A1* | 7/2013 | Ly | G11B 27/34 |
| | | | 700/94 |
| 2014/0043433 A1* | 2/2014 | Scavezze | G02B 27/0172 |
| | | | 348/42 |
| 2015/0066802 A1* | 3/2015 | Goulart | H04W 4/30 |
| | | | 705/346 |
| 2015/0356610 A1* | 12/2015 | Ponoth | G06Q 30/0261 |
| | | | 705/14.58 |

OTHER PUBLICATIONS

Final Office Action, Co-Pending U.S. Appl. No. 14/613,239, mailed Aug. 10, 2017, 12 pages.

Non-Final Office Action, Co-Pending U.S. Appl. No. 14/613,239, mailed Feb. 6, 2018, 9 pages.

Final Office Action, Co-Pending U.S. Appl. No. 14/613,239, mailed Aug. 23, 2018, 11 pages.

Non-Final Office Action, Co-Pending U.S. Appl. No. 14/613,239, mailed Mar. 1, 2019, 9 pages.

Final Office Action, Co-Pending U.S. Appl. No. 14/613,239, mailed Sep. 4, 2019, 8 pages.

Non-Final Office Action, Co-Pending U.S. Appl. No. 14/613,239, mailed Jul. 8, 2020, 14 pages.

Final Office Action, Co-Pending U.S. Appl. No. 14/613,239, mailed Jan. 12, 2021, 15 pages.

* cited by examiner

DYNAMIC LOCALIZED MEDIA SYSTEMS AND METHODS

CROSS-REFERENCE TO RELATED APPLICATION(S)

This application is a continuation of U.S. patent application Ser. No. 14/613,239, filed Feb. 3, 2015, and claims the benefit of U.S. Provisional Patent Application Ser. No. 61/935,003 which was filed on Feb. 3, 2014, both of which applications are incorporated by reference herein in their entireties.

TECHNICAL FIELD

The present disclosure relates to dynamic localized media systems and methods and in particular embodiments to computer operated systems and methods that provide a set of dynamic media to individuals with respect to geographic locations.

BACKGROUND

Currently, individuals are able to navigate computer landscapes such as those landscapes that are presented virtually on an interface such as a screen within an automobile or a mobile device such as a mobile computerized telephone, for example. These techniques have become closer and closer to reality as the presentation of the data becomes more and more realistic. These systems and methods typically provide the user with the ability to navigate between points in a predefined route without dynamically changing the route upon the presentation of options, for example. The present disclosure provides for dynamic localized media systems and methods that allow the user to choose their own route and receive media dynamically in context between various geographic locations.

BRIEF DESCRIPTION OF THE DRAWINGS

Embodiments of the disclosure are described below with reference to the following accompanying drawings.

DETAILED DESCRIPTION

This disclosure is submitted in furtherance of the constitutional purposes of the U.S. Patent Laws "to promote the progress of science and useful arts" (Article 1, Section 8).

Figure 1:
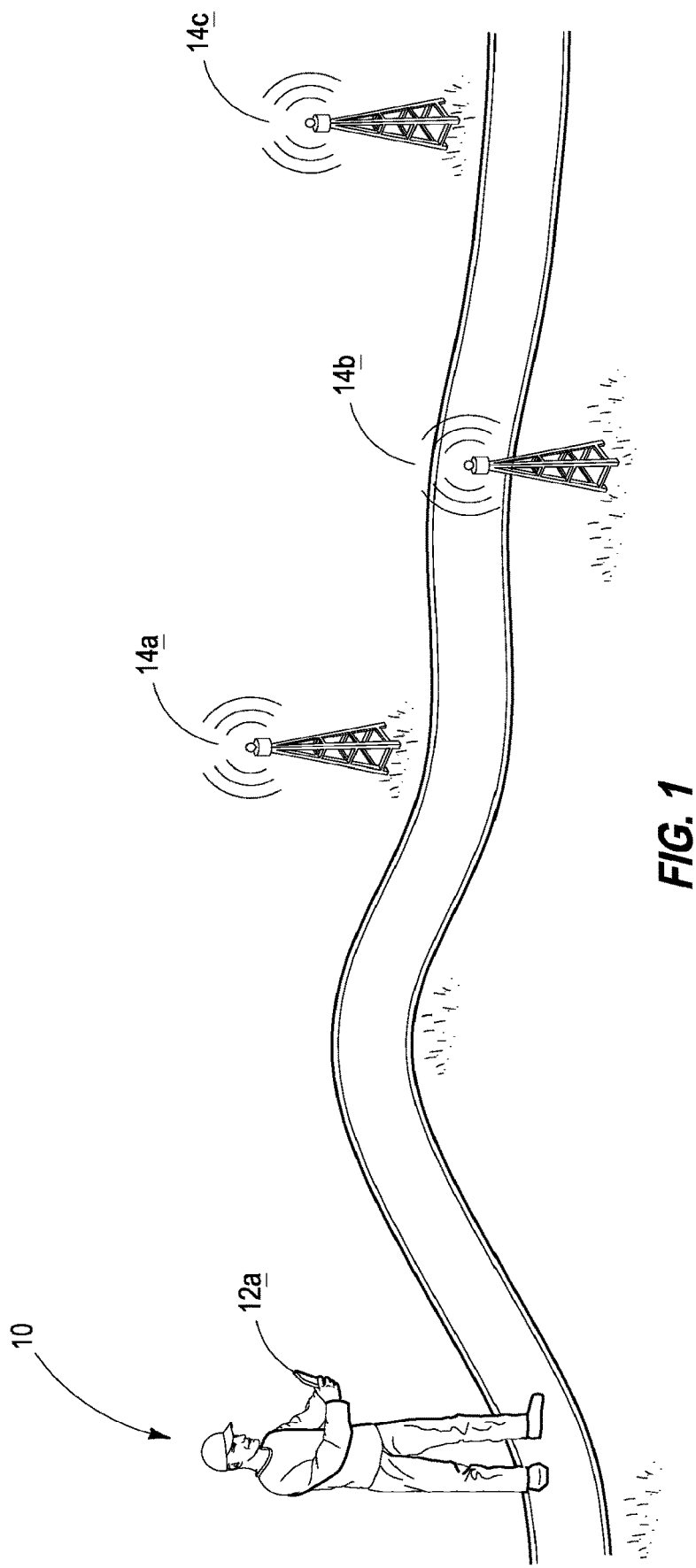
FIG. 1 is a depiction of a user in relation to points according to an embodiment of the disclosure.

The present disclosure will be described with reference to FIGS. 1-17. Referring first to FIG. 1, a user 10 is shown using a device 12 in association with points 14*a*-14*c*. As shown in FIG. 1, this user is shown in relation to these points in a relatively straightforward alignment, wherein if user 10 proceeded down a path, it would first interact with 14*a*, then 14*b*, then 14*c*, in that order. The present disclosure provides systems and methods that allow user 10 to be directed (or lets the user choose direction), rather than a typical path from 14*a* to 14*b*, to 14*c*, for example, instead of from 14*b* to 14*c*, from 14*b* back to 14*a*, if in fact they want to return there. This is just one example of an embodiment of the disclosure.

Figure 2:
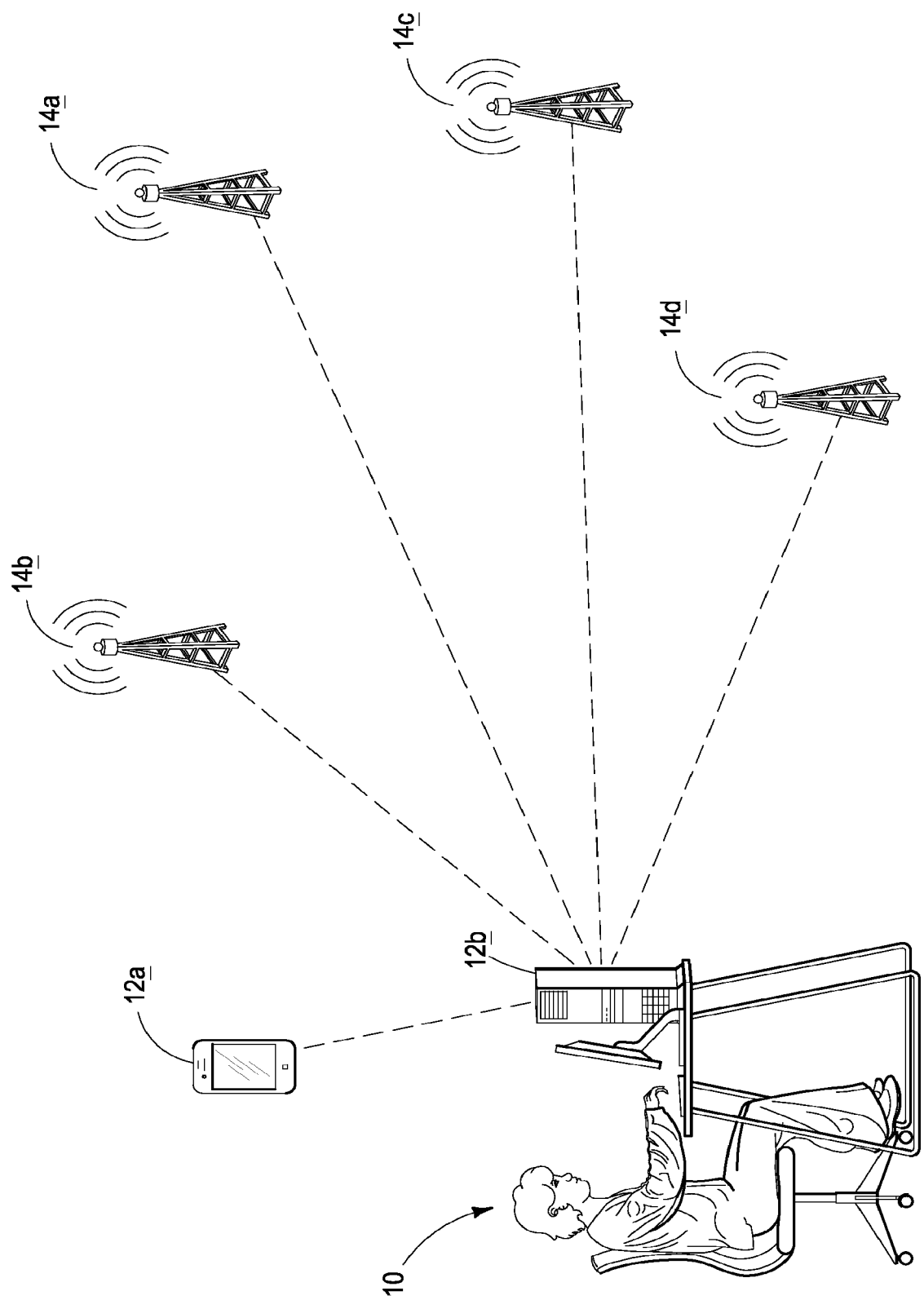
FIG. 2 is a system with an operator according to an embodiment of the disclosure.

Referring to FIG. 2, a user 10 is associated with an operating system 12*b* that may be able to interface with device 12*a*. This operating system 12*b* may be able to communicate with points 14*a* through 14*d*, for example. As shown, these points may be hard wired and/or wirelessly connected to operating system 12*b*. Utilizing this format, operator 10 may be able to preprogram device 12*a* and/or preprogram points 14*a* through 14*d*, for example—or use device 12*a* to create/store data for points 14*a* through 14*d*.

Figure 3:
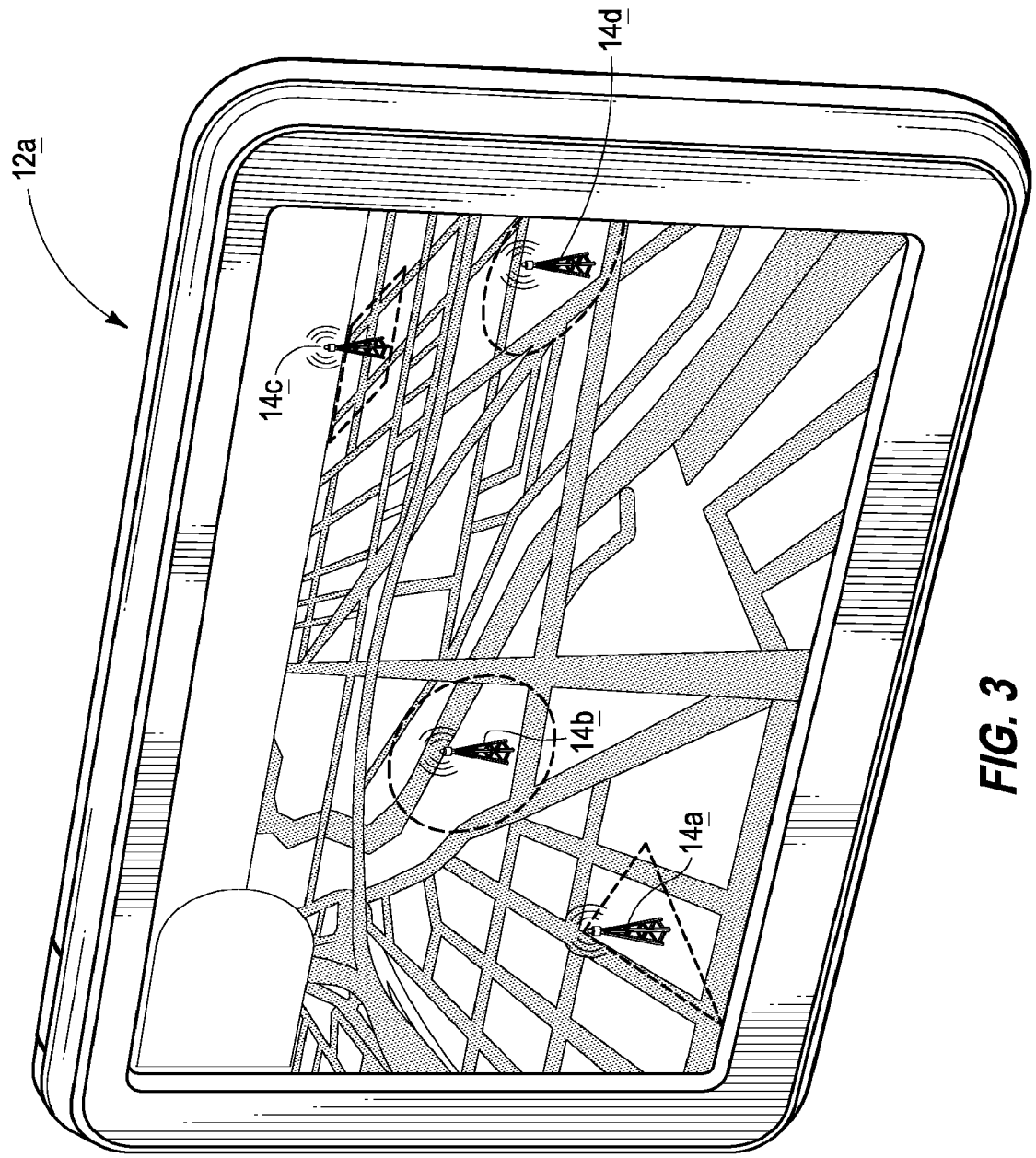
FIG. 3 is an interface of a system that may be used by an operator according to an embodiment of the disclosure.

Referring next to FIG. 3, an interface of device 12*a* is shown that indicates points 14*a* through 14*d* plotted along a map or route. This plotting along a map or route may not be novel, however, providing zones within 14*a* through 14*d* that can trigger 12*a* to indicate that the user utilizing device 12*a* is in some form associated with one of the points, and then directing the user or allowing the user to move to another one of the points according to an embodiment of the disclosure, is one example of the dynamic localized media systems and methods of the present disclosure. Localized media can include a tour of a collection of interesting data (or interests), relevant to the author's intent through operation. Operators' experiences may include music, sounds, text, pictures and/or video that change dynamically based on the locations as the operator moves. Using various region shapes/sizes, operators have more flexibility in a tour with this system.

Figure 4:
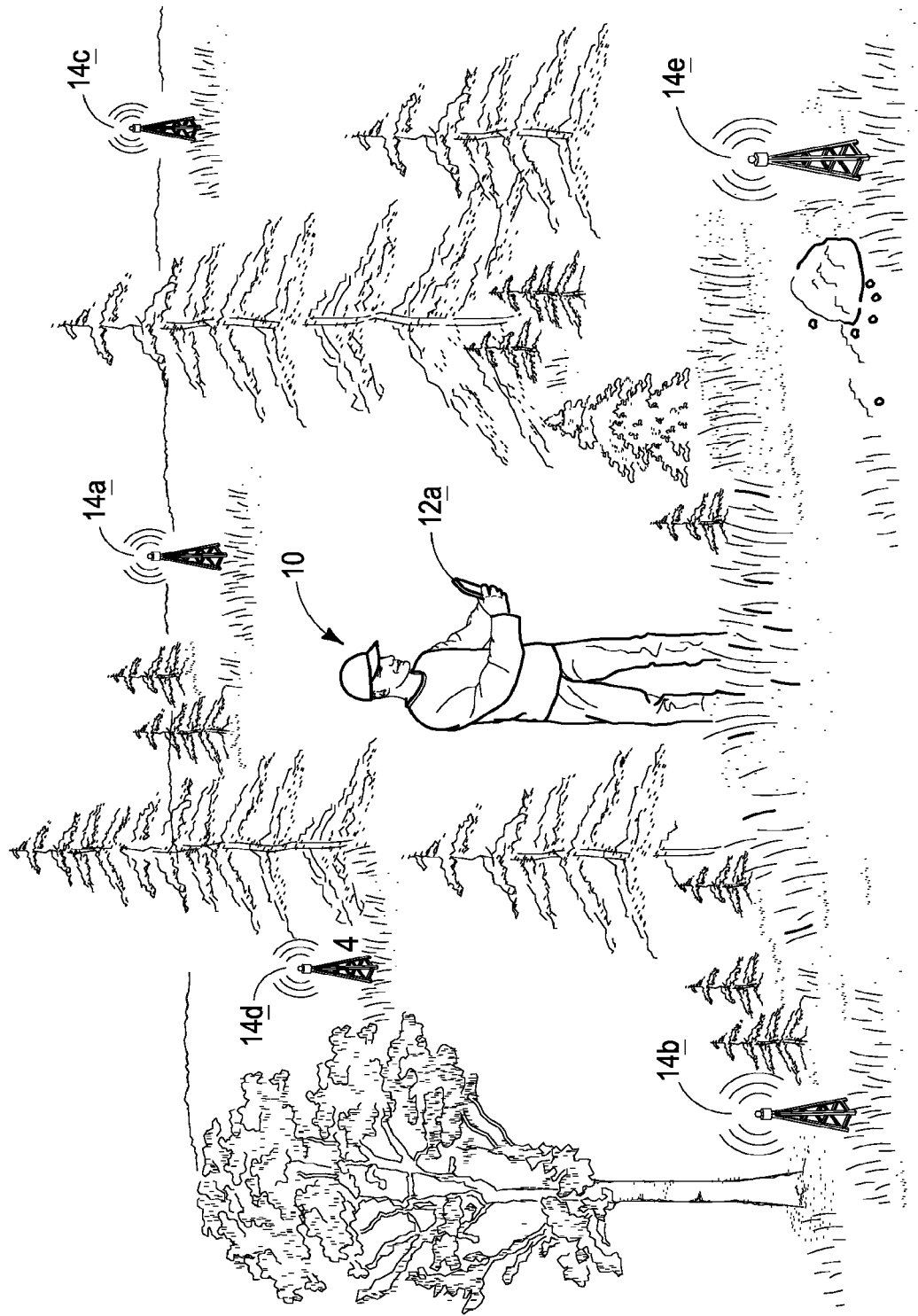
FIG. 4 is a user in a setting with a system according to an embodiment of the disclosure.

Referring next to FIG. 4, user 10 is shown utilizing device 12*a* in association with one or more of points 14*a* through 14*e*. In this manner of fashion, user 10 may be dynamically touring a backdrop such as a forest, for example, as shown in FIG. 4, and may be directed between points utilizing device 12a in an order inconsistent with a straightforward path as indicated in the prior art. According to example implementations, the user 10 can be directed from 14d, for example, back to 14c, or from 14d in a nonlinear fashion back to 14a, for example. This allows the tour experience to change based on the order at which the user moves through points 14a through 14e. A user at a crossing with a point of interest straight ahead, may choose to go left-resulting in a different but valid experience where the system and methods of the present disclosure would present data to the user with the appropriate location in context of their choice.

Figure 5:
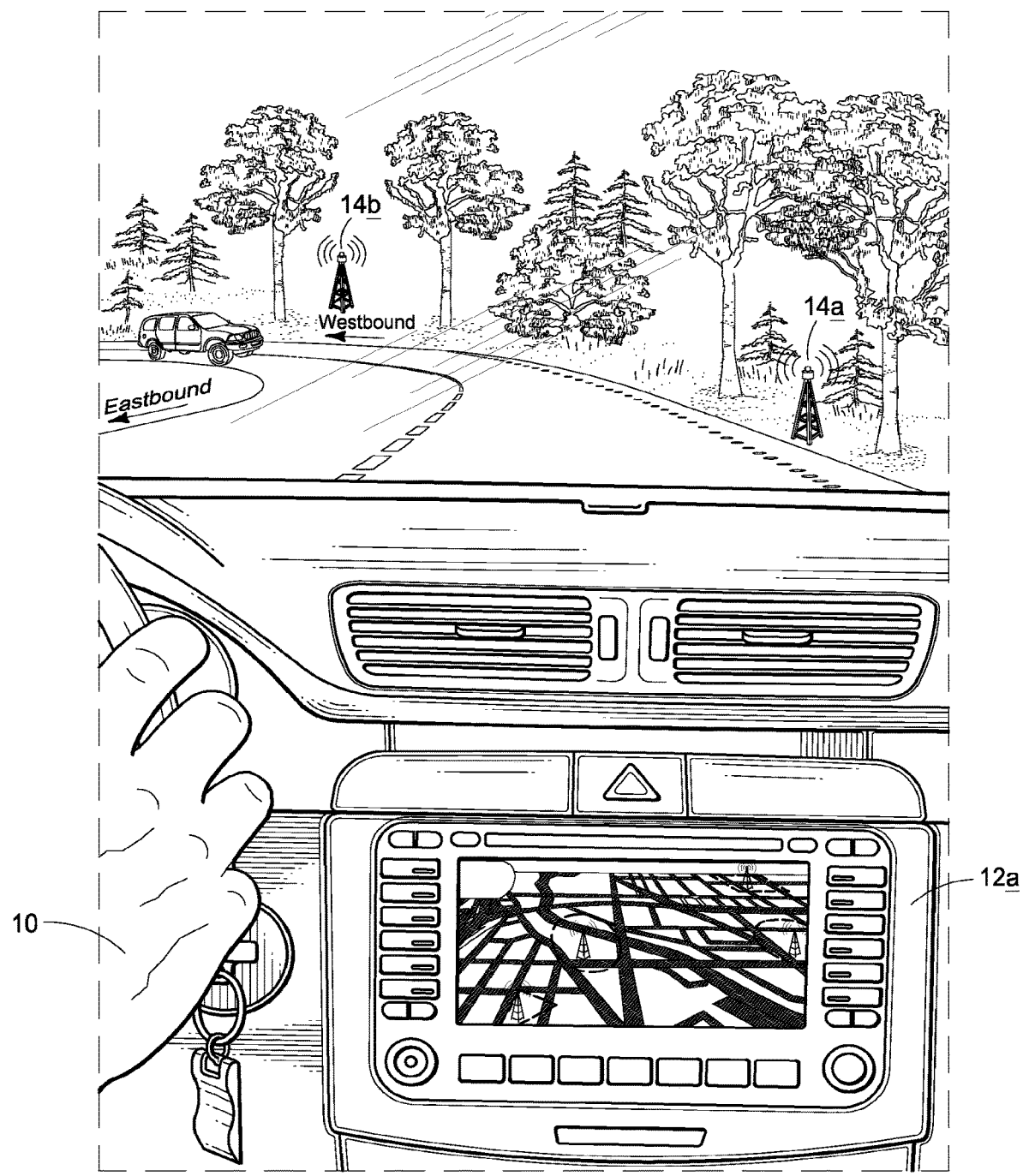
FIG. 5 is another presentation of an interface and an operator in relation to points according to an embodiment of the disclosure.

Referring next to FIG. 5, user 10 may be within a vehicle and within that vehicle may be a device 12a having an interface as shown. With this interface, user 10 may become associated with points 14a or 14b as shown, and may be directed to return or choose alternate routes along a tour predefined and/or dynamically controlled via user 10. The user driving eastbound will receive data in context reverse to the user driving westbound.

Figure 6:
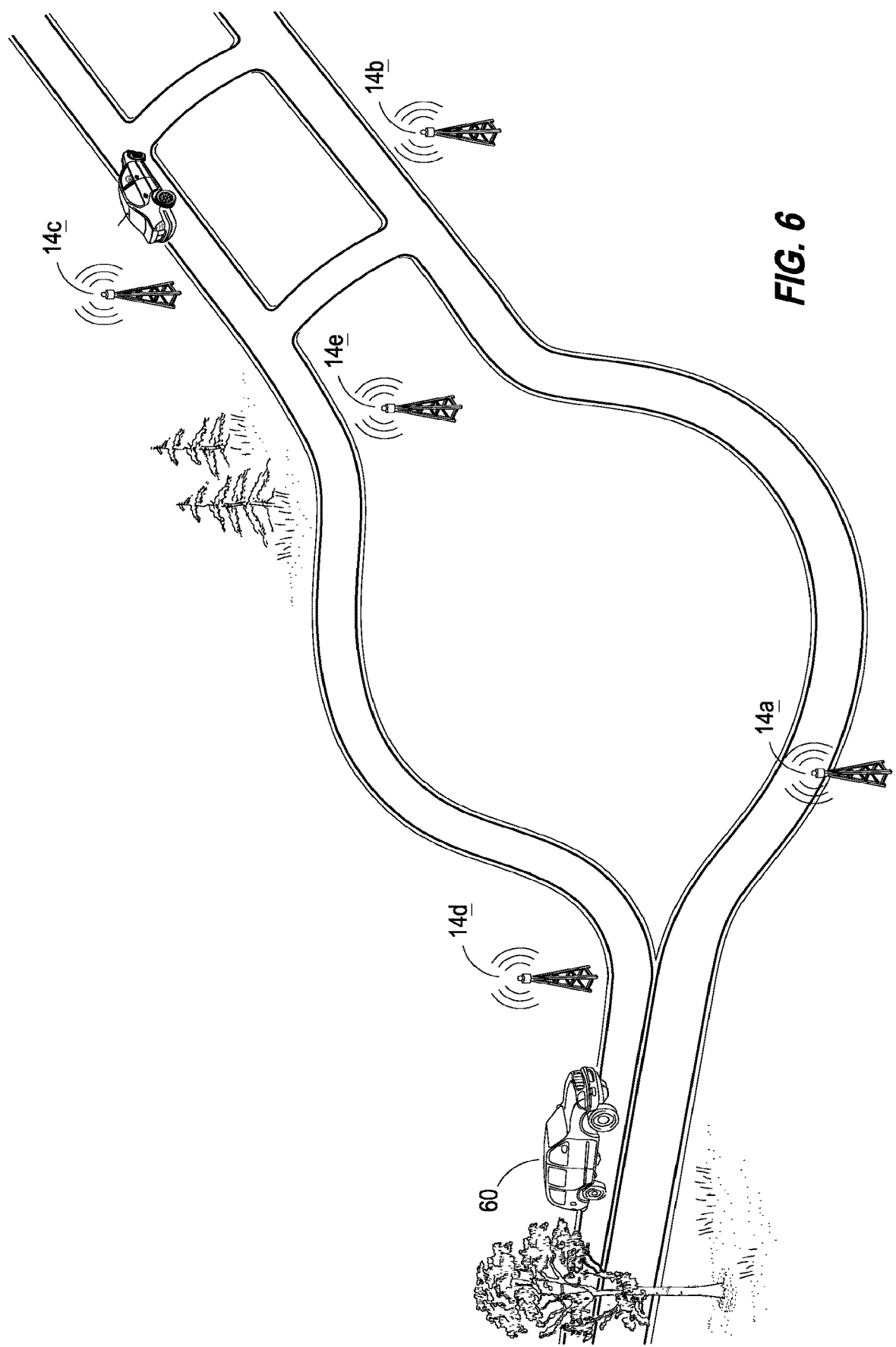
FIG. 6 is an overview of a mobile vehicle in relation to points according to an embodiment of the disclosure.

Referring to FIG. 6, an overview of an operator operating a vehicle such as vehicle 60 in relation to various pinpoints 14a-14e is shown. As can be seen, pinpoints 14a and 14d can be along alternative routes of a path or tour. According to example implementations of the present disclosure, vehicle 60 being operated by an operator such as an operator 10 can be directed to return along these routes in directions that are nonlinear. For example, vehicle 60 may be directed to (or freely choose to) proceed to point 14c and then return via point 14b, 14e, or 14d, for example. The implementations are endless and are provided by dynamically controlling the direction of the tour by the user and/or vehicle that is proceeding along the tour.

Figure 7:
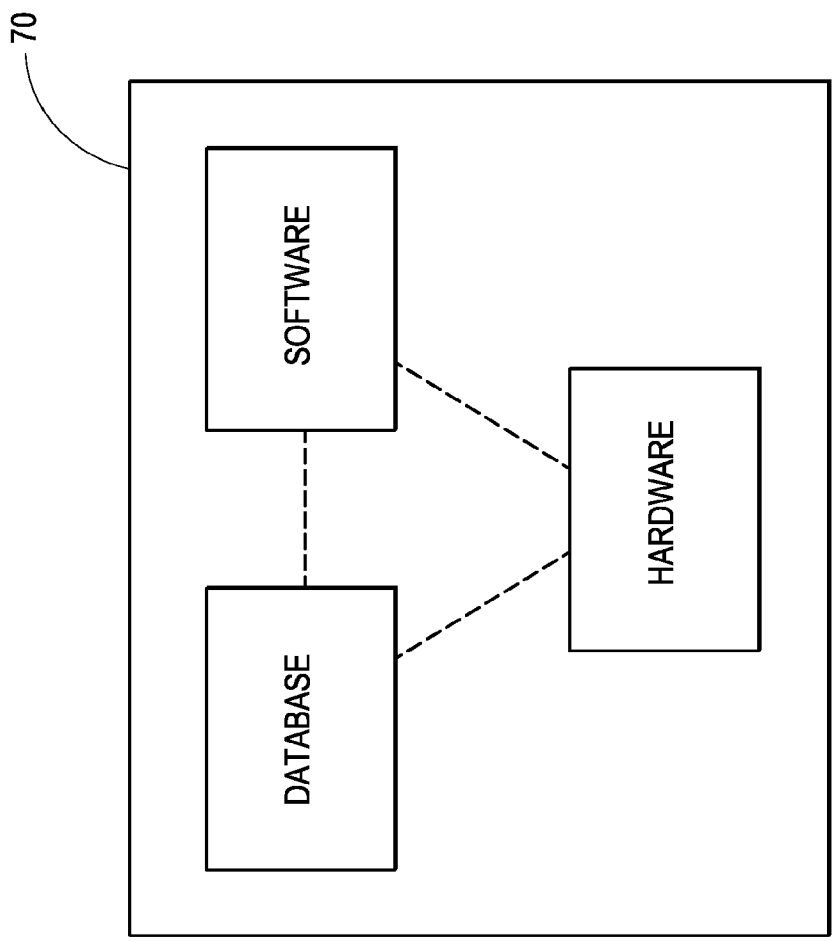
FIG. 7 is a computer operating system according to an embodiment of the disclosure.

Referring next to FIG. 7, a system that may be utilized within the device is described herein can be exemplified as system 70. This processing circuitry 70 can include a database, software, and hardware in accordance with example implementations.

The dynamic localized media systems and methods include and can utilize a processor. The processor can include personal computing system that includes a computer processing unit that can include one or more microprocessors, one or more support circuits, circuits that include power supplies, clocks, input/output interfaces, circuitry, and the like. Generally, all computer processing units described herein can be of the same general type. The computing system can include a memory that can include random access memory, read only memory, removable disc memory, flash memory, and various combinations of these types of memory. The memory can be referred to as a main memory and be part of a cache memory or buffer memory. The memory can store various software packages and components such as an operating system.

The computing system may also include a web server that can be of any type of computing device adapted to distribute data and process data requests. The web server can be configured to execute system application software such as the reminder schedule software, databases, electronic mail, and the like. The memory of the web server can include system application interfaces for interacting with users and one or more third party applications. Computer systems of the present disclosure can be standalone or work in combination with other servers and other computer systems that can be utilized, for example, with larger corporate systems such as financial institutions, insurance providers, and/or software support providers. The system is not limited to a specific operating system but may be adapted to run on multiple operating systems such as, for example, Linux and/or Microsoft Windows. The computing system can be coupled to a server and this server can be located on the same site as computer system or at a remote location, for example.

Figure 8:
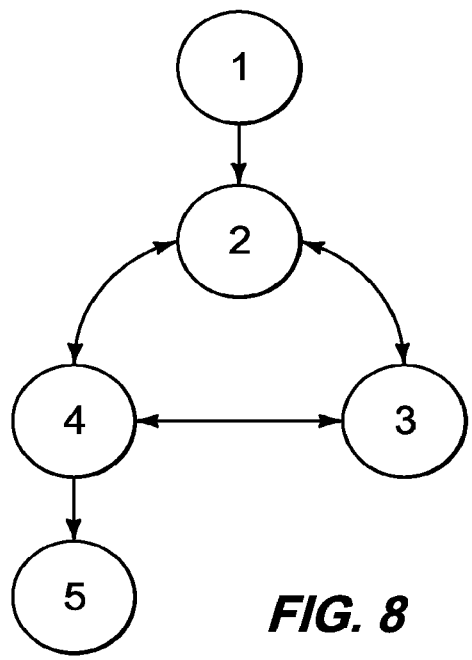
FIG. 8 is an optional set of paths according to an embodiment of the disclosure.
Figure 9:
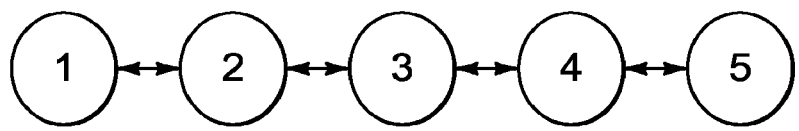
FIG. 9 is a bidirectional tour (a set/series of dynamic localized media) according to an embodiment of the disclosure.
Figure 10:
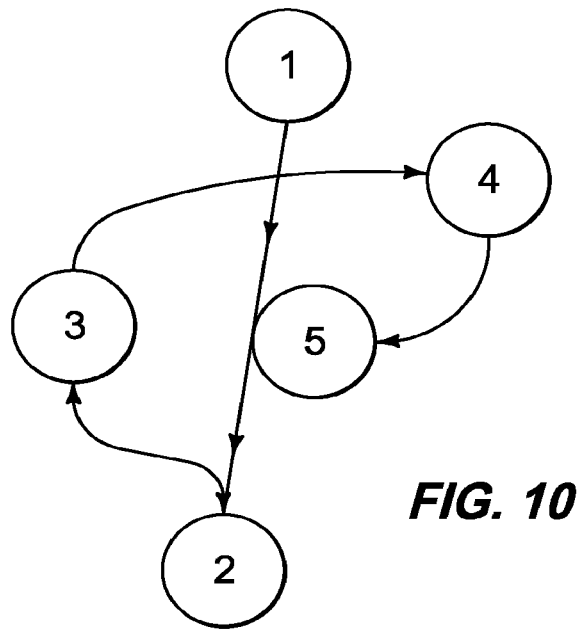
FIG. 10 is another alternative tour (a set/series of dynamic localized media) according to an embodiment of the disclosure.

Referring next to FIGS. 8-10, example dynamic localized media options are shown in these figures. In accordance with FIG. 8, a dynamic localized media experience can be to proceed from location 1 to 2, and then alternatively choose between 3 or 4, and then upon proceeding to 3, then on to 4, or upon proceeding to 4, then on to 3. Accordingly, the dynamic localized media experience can end at 5, or may end at 3, for example, but typically may end at 5. In accordance with an example implementation, a linear tour may be provided with respect to FIG. 9 as points proceed to 1, 2, 3, 4, and on to 5, in that order. The user may join the tour at 3 and head in reverse towards 2 and then onto 1. In accordance with another example and with respect to FIG. 10, another dynamic localized media tour route is provided between 1, 2, 3, on to 4, and then 5, but these routes can be disassociated with geographic proximity. As can be seen point 1 is closest to point 4; however, the dynamic tour may dictate that the furthest geographic distance may be better suited to provide the tour than the most proximate geographic distance. This system allows a non-linear geographic path in both an ordered or unordered experience. The user has the ability to move between points and the system can restrict providing data if the tour must be done in order; or allow the user to not be restricted in receiving data based on where the user proceeds between points. (For example, a scavenger hunt may need to cover each point in any order. A treasure hunt may need to build upon each previous find. As another example, the tour may be provided as part of a game, such as a video game, and/or as the game itself; providing a type of game-play mechanic that allows for various types of puzzles and/or a game that may be augmented according to the data associated with this platform.)

Figure 11:
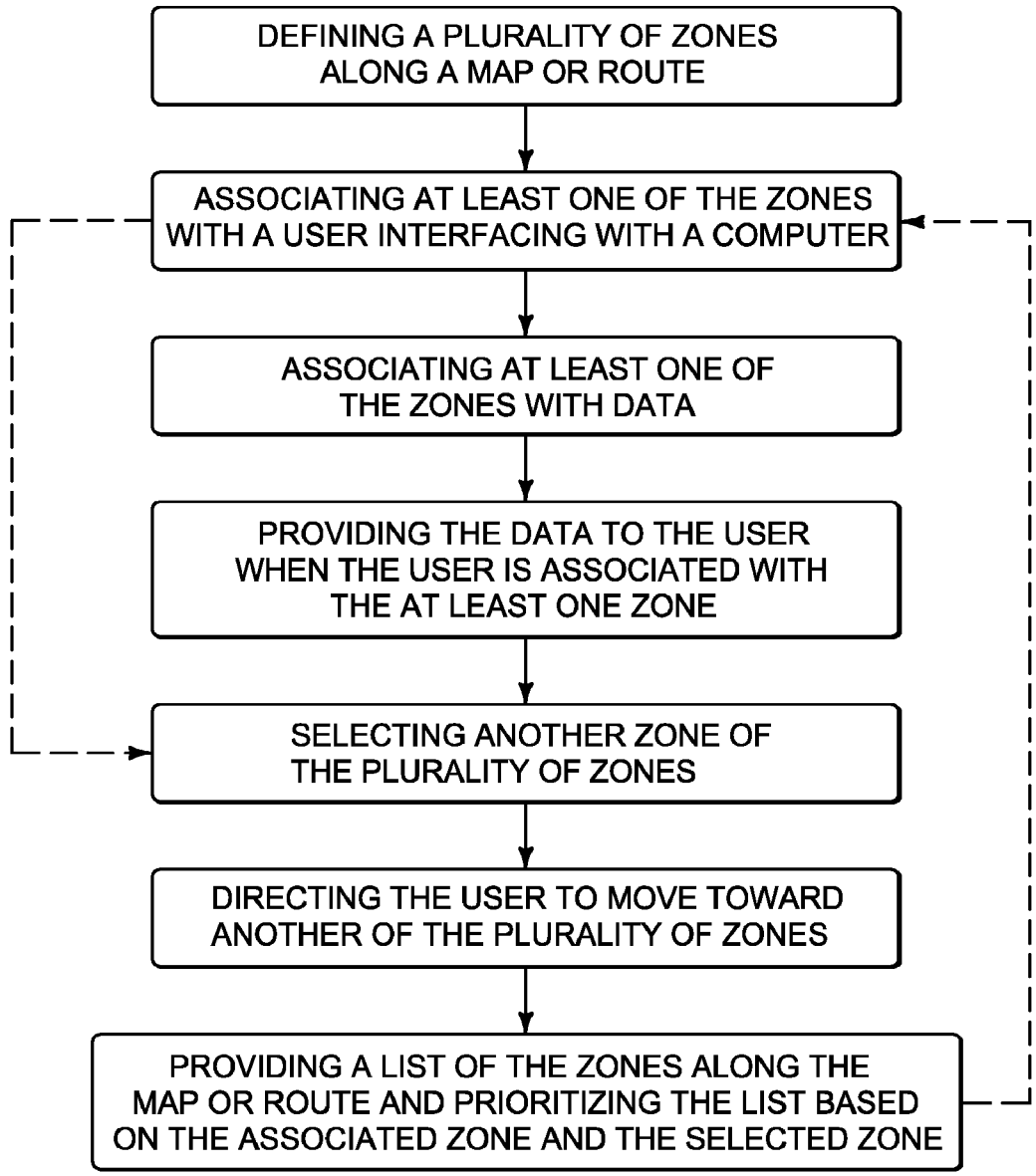
FIG. 11 is a method for providing a computer aided tour according to an embodiment of the disclosure.

Referring to FIG. 11, a method for providing a computer aided tour is provided according to an embodiment of the disclosure. The method can include creating, operating, sorting, managing and/or maintaining a collection of dynamically controlled localized media experiences and/or tours. The method can include defining a plurality of zones along a map or route. In the next step, at least one of the zones can be associated with a user interfacing with a computer. The next step can include selecting another zone of the plurality of zones. The selecting can be random and/or non-linear along the map or route. The selecting can be based on a profile established by the user.

Intermediate steps of the method can include associating the at least one of the zones with data and/or providing the data to the user when the user is associated with the at least one zone. The data is one or more of music, sound, text, pictures, and/or video, for example. The data can be acquired from a database associated with at least one zone. The data may vary depending on previously accessed zones and may influence the rest of the set of zone access. The zones may overlap in locations and only allow access by a sequence designated by the author.

In the next step a list of the zones along the map or route can be developed and/or provided. The order of the zones can be prioritized based on the associated zone and the selected zone. The types of zones may also be filtered by location.

In a following step, the user can be directed to move toward another of the plurality of zones, for example with the user interface. As the user may continue to any zone, the system will provide adjusted data dynamically.

In accordance with example implementations, steps of FIG. 11 for example may be skipped to subsequent steps and/or previous steps can be returned to from subsequent steps. As an example, after the step of associating at least one of the zones with a user interfacing with a computer, the next step may be selecting another zone of the plurality of zones. As another example, after providing a list of the zones along the map or route and prioritizing the list based on the associated zone and the selected zone, the next step may be associating at least one of the zones with a user interfacing with a computer. Accordingly, the system can run in a continuous loop with the movement of the user in relation to the zones.

Referring to FIGS. 12-17, processes for acquiring and/or processing data utilizing processing circuitry 70 are shown. In accordance with example implementations, these processes may be utilized in connection with the processing circuitry described to provide the dynamic localized media options. The processes may use software and/or hardware of the following combinations or types. For example, with respect to server-side languages, the circuitry may use Java, Python, PHP, .NET, Ruby, Javascript, or Dart, for example. Some other types of servers that the systems may use include Apache/PHP, .NET, Ruby, NodeJS, Java, and/or Python. Databases that may be utilized are Oracle, MySQL, SQL, NoSQL, or SQLLite (for Mobile). Client-side languages that may be used, this would be the user side languages, for example, are ASM, C, C++, C#, Java, Objective-C, Swift, Actionscript/Adobe AIR, or Javascript/HTML5. Communications between the server and client may be utilized using TCP/UDP Socket based connections, for example, as Third Party data network services that may be used include GSM, LTE, HSPA, UMTS, CDMA, WiMax, WiFi, Cable, and DSL. The hardware platforms that may be utilized within processing circuitry 70 include embedded systems such as (Raspberry Pl/Arduino), (Android, IOS, Windows Mobile)-phones and/or tablets, or any embedded system using these operating systems, i.e., cars, watches, glasses, headphones, augmented reality wear etc., or desktops/laptops/hybrids (Mac, Windows, Linux). The architectures that may be utilized for software and hardware interfaces include x86 (including x86-64), or ARM.

The server-side state management without client side memory can process between the server and the client sides in the following manners. For example, in Step 1, you can send server ID/marker/beacon for processing, collection ID, and unique device ID, and then Step 2 would be to wait for data response (media; such as video, text, sound, etc.) or null response from the server. Beacons (also marker, location, point) can include where data is associated to a unique location, not necessarily a physical device in that it may be a GPS coordinate or a unique sound or a computer identifiable code that can be scanned and interpreted, at said location, etc.

On the server side, Step 1 would be to retrieve marker ID for processing, check against collection ID for data using unique device ID for history; Step 2 would be to record device ID current/previous marker ID; Step 3 would be to process next interest marker; and Step 4 would be to return data response to client if available, null if none.

The server-side state management with client side memory can process between the server and the client sides in the following manners: Step 1 can be to send server ID/marker/beacon for processing, collection ID, and unique device ID; Step 2, wait for data marker ID response (ID of marker for media-sound/image/video/text-playback) or null response from server; and Step 3, playback data marker ID response from device Memory. On the server side, Step 1, retrieve marker ID for processing, check against collection ID for data using unique device ID for history; Step 2, record device ID current/previous marker ID; Step 3, process next interest marker; and Step 4, return data marker ID response to client if available, null if none.

The client-side (collection information is downloaded and stored directly to the device, state processing is done locally and with or without need for external network connection) can process in the following manners: Step 1, marker info processing; Step 2, check if valid ID against collection stored memory; Step 3, if valid ID, playback data from marker ID, if not, record marker change if necessary or ignore marker; and Step 4, record marker change, wait for new marker.

Figure 12:
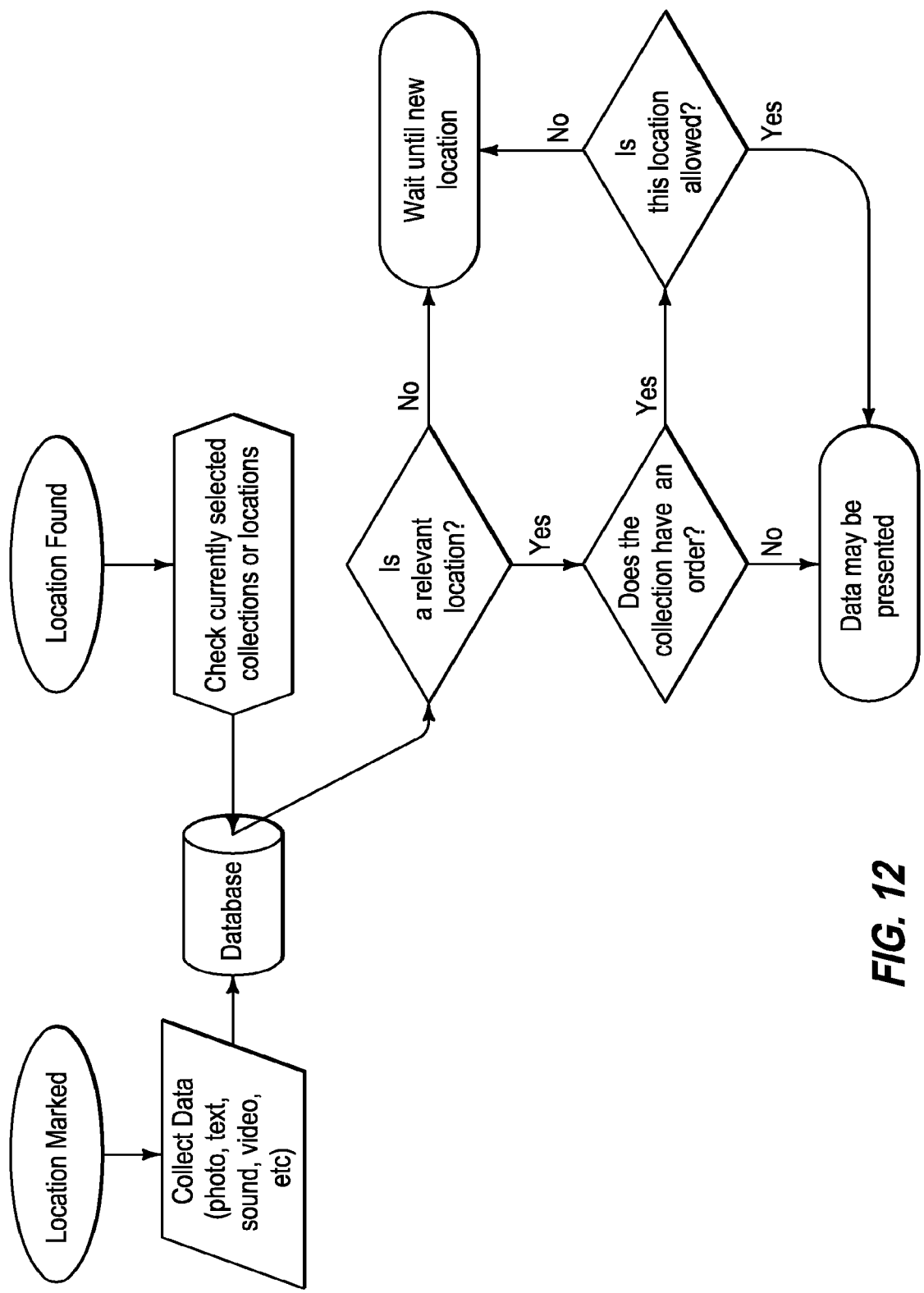
FIG. 12 is a process for providing dynamic localized media systems and methods according to an embodiment of the disclosure.

Referring next to FIG. 12, according to one process, location can be marked and data collected, then stored in a database. A beacon can be found by many methods such as by stumbling across it and recognizing it visually, such as while proceeding down a tour, and/or the users device recognizing a beacon via QR Code, NFC, iBeacons, and/or sound signals. The process would include checking currently selected collections or locations and storing them in the database. A process can include determining whether it is a relevant location; if the answer is yes, then does the collection have an order that is associated with the location. If it does, then is the location allowed; if not, you would move on to a new location. If it is allowed, then data may be presented to the device from the location beacon such as 14a through 14e described herein.

Figure 13:
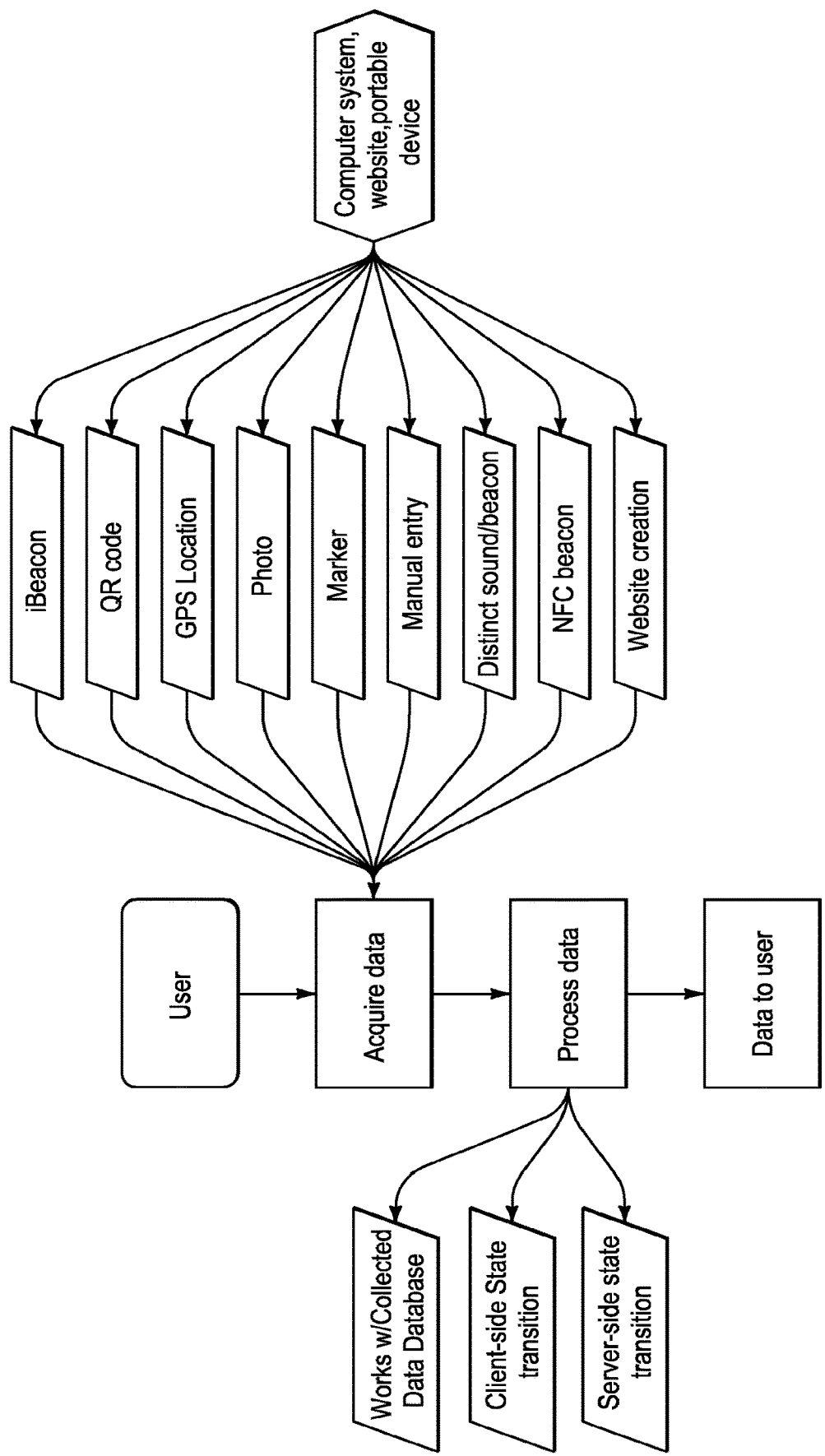
FIG. 13 is a process for providing dynamic localized media systems and methods according to an embodiment of the disclosure.
Figure 14:
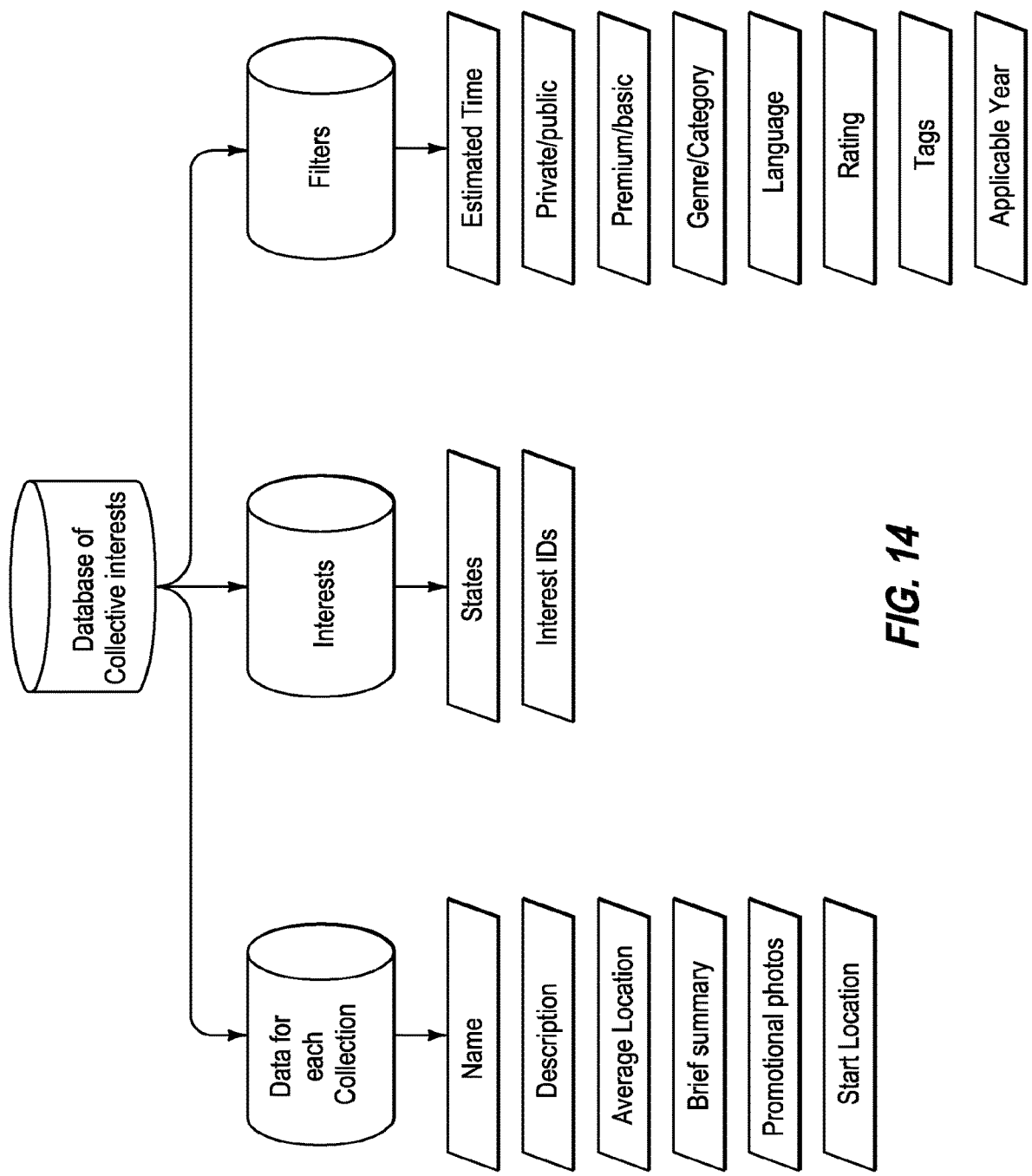
FIG. 14 is a process for providing dynamic localized media systems and methods according to an embodiment of the disclosure.
Figure 15:
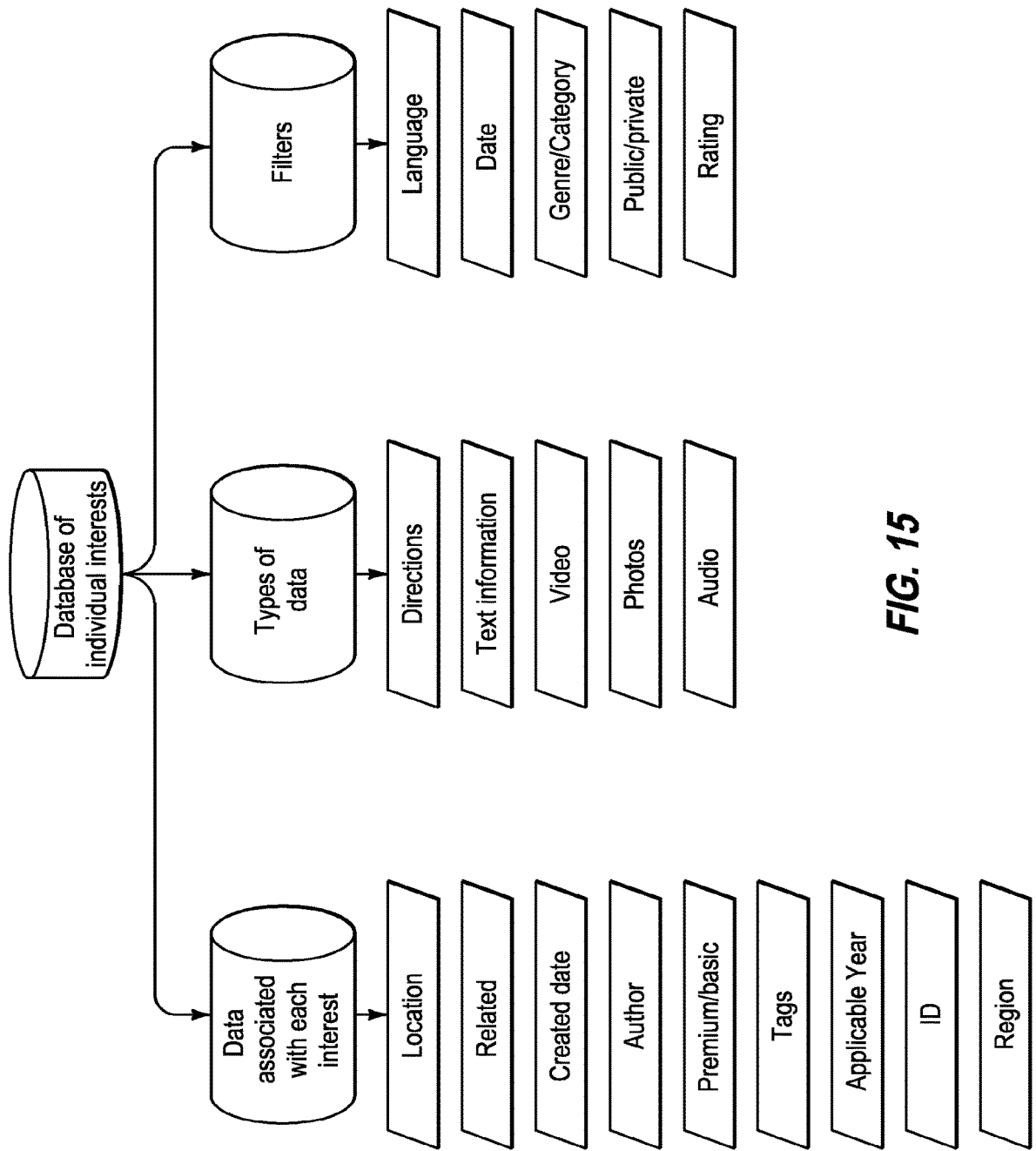
FIG. 15 is a process for providing dynamic localized media systems and/or methods according to an embodiment of the disclosure.

In FIGS. 13 and 14, examples of data collection within the database are described. From a client-side state transition and server-side state transition as described previously, iBeacon, QR code, GPS location, photo, marker, manual entry, distinct sound/beacons, NFC beacons, web site creation, these are all examples of points such as 14a through 14e that may be utilized to trigger a tour event that provide an operator with a different experience in their tour. This data can be acquired by the device such as 10a shown and the data processed according to the client-side state transition or server-side state transition and entering data to the user. All of these beacons, QR codes, etc., can be preprogrammed utilizing a computer system, web site, portable device, such as that shown in FIG. 2 and disclosed as device 12b. In another example, database of collective interests can be provided. Now these are interests to the user that are associated with device 12a and can be preprogrammed in relation to device 12b and the beacons. Data for each collection of interests can include the name, description, average location, brief summary, promotional photos, start locations, for example. The interests can include states, interest IDs, for example, and filters may be utilized that can include estimated time, private/public, premium/basic, genre/category, language, rating, tags, applicable year. These filters can be utilized to provide a more searchable database of collective interests. Within the collective interests and referring to FIG. 15 is a database of individual interests. These individual interests can be associated with individual locations and/or users, for example, and can also include data associated with each interest, types of data, and/or filters. The data associated with each interest can include the location, related, created date, author, premium/basic, tags, applicable year, ID, and region. Types of data can include directions, text information, video, photos, and audio, for example. Filters can include language, date, genre/category, public/private, and/or rating, for example.

Figure 16:
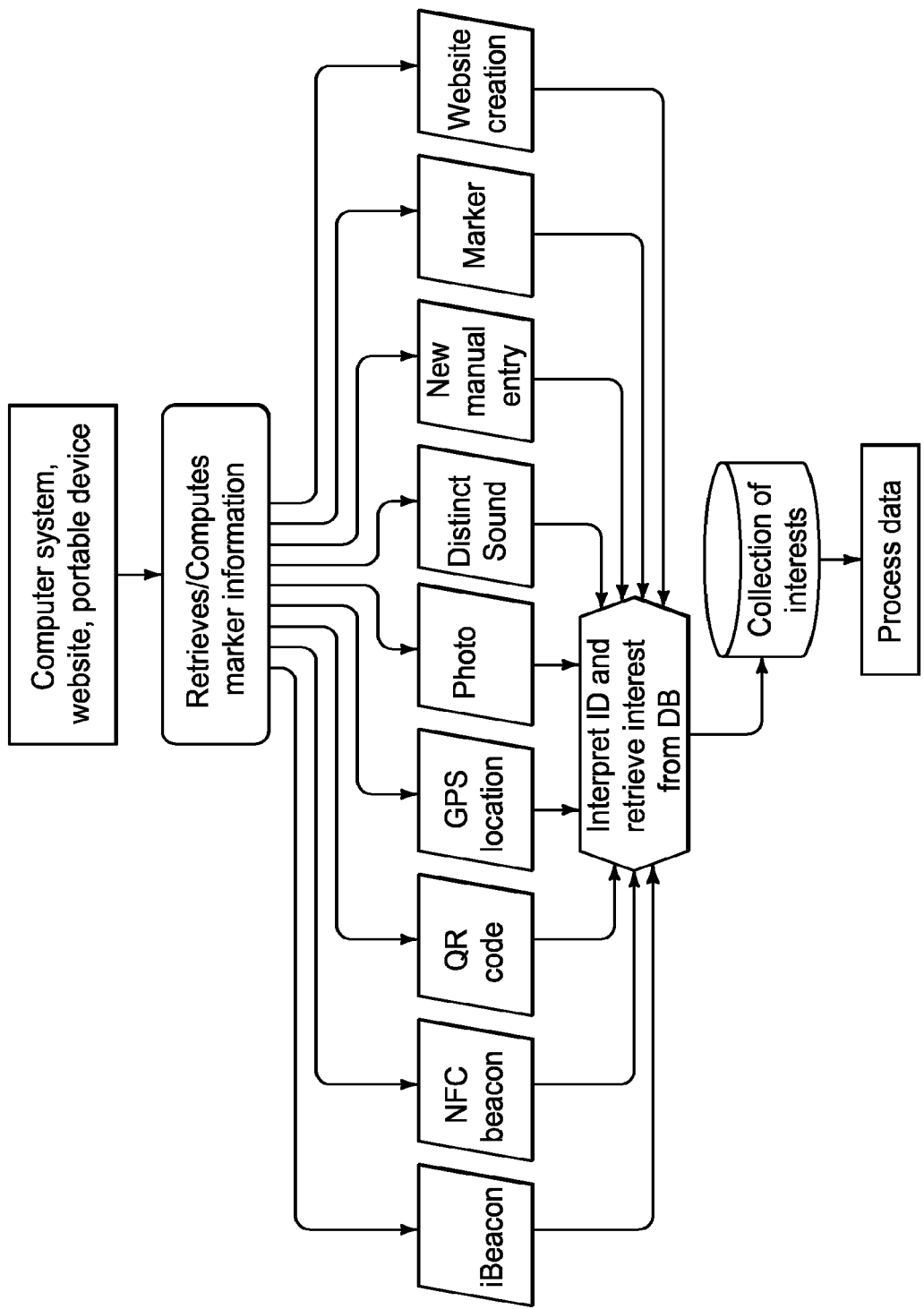
FIG. 16 is another process for providing dynamic localized media systems and/or methods according to an embodiment of the disclosure.

Referring next to FIG. 16, an example process for acquiring the data is shown that utilizes the computer system website portable device such as devices 10*a* or 10*b* shown herein. That system can retrieve/compute marker information that can include iBeacon, NFC beacon, QR code, GPS location, photo, distinct sound, new manual entry, marker, or website creation. The system can then interpret the ID and retrieve interests from the database, and the collection of interests as shown in FIG. 14 can be provided, and then processed.

Figure 17:
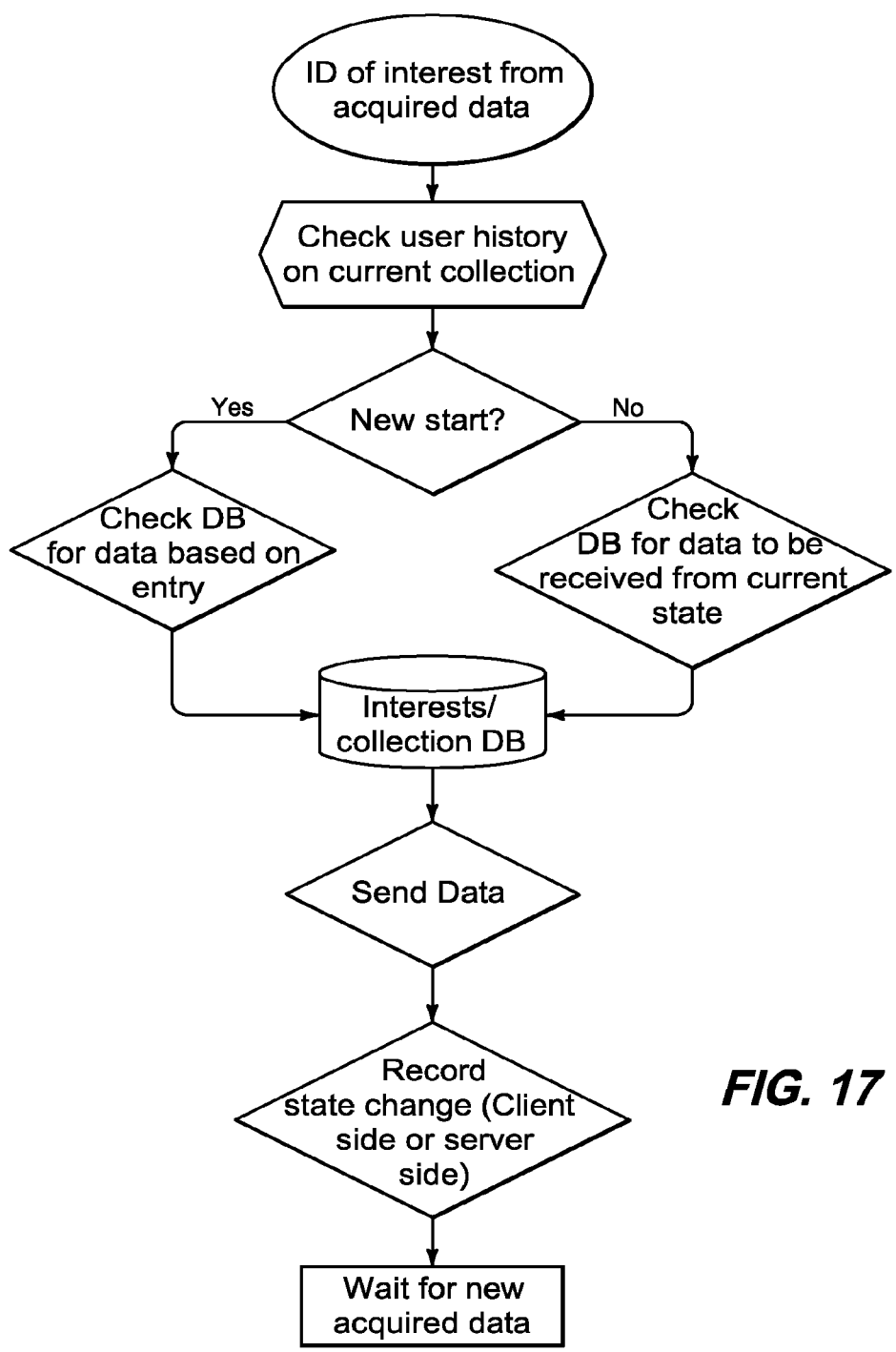
FIG. 17 is another process for providing dynamic localized media systems and methods according to an embodiment of the disclosure.

Referring lastly to FIG. 17, another process is shown that includes ID of interest from acquired data, checking the user history on current collection, and then determining whether or not to start. If a start is triggered, the database is checked for data based on entry, and then interests collected according to FIGS. 12 and 13, for example, and then the data is sent and a record state change (client-side or server-side) is made. This is the direction change that takes the user to a new location rather than proceeding along a linear path. A user then simply waits for new acquired data. If the new start is a no, then the system returns to and checks the database for data to be received from current state. That current state is the device, whether it is being triggered via proximity to a point and/or initiated by the user.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect.

I claim:

1. A method for generating dynamic localized media experiences, the method comprising:
   receiving, at a computer system, a user input to define a plurality of geographic zones that each include computer-readable data representing a corresponding physical geographic area, wherein multiple, non-ordered physical geographic areas are represented by the plurality of geographic zones;
   accessing, by the computer system, localized media experiences that each include media data configured for output to a computing device associated with a user;
   for a first geographic zone in the plurality of geographic zones:
      linking, by the computer system, a first set of localized media experiences to the first geographic zone,
         wherein the first set comprises a first plurality of localized media experiences and a second different plurality of localized media experiences;
      associating with the first set of localized media experiences, by the computer system, a first criterion by which a localized media experience in the first set is selected for provision to the user when the user is located proximate to the physical geographic area corresponding to the first geographic zone; and
      storing a first record in a database that links the first set of localized media experiences and the first criterion to a unique identifier of a first beacon that is configured with processing circuitry and uniquely associated with the first geographic zone,
         wherein a localized media experience in the first set of localized media experiences is accessible by the computing device associated with the user based on proximity between the computing device and the first beacon and based on the stored unique identifier of the first beacon,
         wherein, upon identification that the first plurality of localized media experiences was previously accessed by the user, enabling presentation of the second different plurality of localized media experiences that is associated with a second different media data than a first media data associated with the first plurality of localized media experiences; and
   for a second geographic zone in the plurality of geographic zones:
      linking, by the computer system, a second set of localized media experiences to the second geographic zone,
         wherein the second set localized media experiences comprises a third plurality of localized media experiences and a fourth different plurality of localized media experiences, and
         wherein at least a subset of the second set of localized media experiences is different from a subset of the first set of localized media experiences;
      associating with the second set of localized media experiences, by the computer system, a second criterion by which a localized media experience in the second set is selected for provision to the user when the user is located proximate to the physical geographic area corresponding to the second geographic zone; and
      storing a second record in a database that links the second set of localized media experiences and the second criterion to a unique identifier of a second beacon that is configured with processing circuitry and uniquely associated with the second geographic zone, wherein a localized media experience in the second set of localized media experiences is accessible by the computing device associated with the user based on proximity between the computing device and the second beacon and based on the stored unique identifier of the second beacon.

2. The method of claim 1, wherein at least one of the first criterion or the second criterion comprises a degree of match between one or more interests of the user and an attribute of a localized media experience in a corresponding set of localized media experiences.

3. The method of claim 1, wherein at least one of the first criterion or the second criterion comprises an indication that the user has not previously received a selected one of the localized media experiences in a corresponding set of localized media experiences.

4. The method of claim 1, wherein the first criterion comprises an identification of at least a third geographic zone in the plurality of geographic zones and specifies:
   a first localized media experience in the first set is to be selected for provision to the user when location history associated with the user indicates that the user has previously been located proximate to the physical geographic area corresponding to the third geographic zone; and
   a second localized media experience in the first set is to be selected for provision to the user when location history associated with the user indicates that the user has not previously been located proximate to the physical geographic area corresponding to the third geographic zone.

5. The method of claim 4, wherein the first criterion further specifies:

the first localized media experience in the first set is to be selected for provision to the user when the location history associated with the user indicates that the user was not proximate to another geographic zone after being located proximate to the third geographic zone and before being located proximate to the first geographic zone; and a third localized media experience in the first set is to be selected for provision to the user when the location history associated with the user indicates that the user was proximate to a fourth geographic zone after being located proximate to the third geographic zone and before being located proximate to the first geographic zone.

6. The method of claim 1, wherein at least one of the first criterion or the second criterion comprises a language selection by the user.

7. The method of claim 1, wherein the physical geographic areas represented by the plurality of geographic zones each are defined by at least one of: a latitude, a longitude, or an altitude.

8. The method of claim 1, wherein the media data associated with each of the localized media experiences is one or more of music, sound, text, pictures, or video data.

9. At least one computer-readable storage medium, excluding transitory signals and carrying instructions, which, when executed by at least one data processor of a system, cause the system to:

receive a user input to define a plurality of geographic zones that each include computer-readable data representing a corresponding physical geographic area, wherein multiple, non-ordered physical geographic areas are represented by the plurality of geographic zones;

access localized media experiences that each include media data configured for output to a computing device associated with a user;

link a different set of the localized media experiences to each of the plurality of geographic zones, wherein at least one of the different sets of localized media experiences comprises a plurality of localized media experiences, wherein each different set of localized media experiences is linked, by a record in a database, to a unique identifier of a corresponding beacon that is configured with processing circuitry and uniquely associated with a corresponding one of the plurality of geographic zones, wherein the corresponding beacon is uniquely associated with the different set of localized media experiences, and wherein a localized media experience in the different set of localized media experiences is accessible by the computing device associated with the user based on proximity between the computing device and the corresponding beacon and based on the unique identifier of the corresponding beacon; and define, for each of the plurality of geographic zones, a respective criterion by which a localized media experience in the different set of localized media experiences linked to the geographic zone is selected for provision to the user when the user is located within the physical geographic area corresponding to the geographic zone.

10. The at least one computer-readable storage medium of claim 9, wherein a criterion associated with a first one of the geographic zones comprises a degree of match between one or more interests of the user and an attribute of a localized media experience in the different set of localized media experiences linked to the first geographic zone.

11. The at least one computer-readable storage medium of claim 9, wherein a criterion associated with a first one of the geographic zones comprises an indication that the user has not previously received a selected one of the localized media experiences in the different set of localized media experiences linked to the first geographic zone.

12. The at least one computer-readable storage medium of claim 9, wherein a criterion associated with a first one of the geographic zones comprises an identification of a second one of the geographic zones and specifies:

a first localized media experience in the different set of localized media experiences linked to the first geographic zone is to be selected for provision to the user when location history associated with the user indicates that the user has previously been located within the physical geographic area corresponding to the second geographic zone; and a second localized media experience in the different set of localized media experiences linked to the first geographic zone is to be selected for provision to the user when location history associated with the user indicates that the user has not previously been located within the physical geographic area corresponding to the second geographic zone.

13. The at least one computer-readable storage medium of claim 9, wherein a criterion associated with a first one of the geographic zones comprises a language selection by the user.

14. The at least one computer-readable storage medium of claim 9, wherein the physical geographic areas represented by the plurality of geographic zones each are defined by one or more of: a latitude, a longitude, or an altitude.

15. The at least one computer-readable storage medium of claim 9, wherein linking the different sets of the localized media experiences to each of the plurality of geographic zones further causes the system to:

process the media data associated with a first set of localized media experiences of the different set of localized media experiences to compile a second set of localized media experiences of the different set of localized media experiences that is associated with different media data than the media data associated with the first set of localized media experiences, wherein the second set of localized media experiences comprises a second plurality of localized media experiences, and wherein the second set of localized media experiences is selected from the localized media experiences based on the processing of the media data associated with the first set of localized media experiences.

16. The at least one computer-readable storage medium of claim 9, wherein linking the different set of the localized media experiences to each of the plurality of geographic zones further causes the system to:

identify media data associated with one or more different localized media experiences in the different set of the localized media experiences that were previously accessed by the user, determine one or more interests of the user using the identified media data associated with the one or more different localized media experiences, and determine, for at least one localized media experience in the different set of the localized media experiences, a degree of similarity between the one or more interests of the user and the at least one localized media experience.

17. A system comprising:
at least one hardware processor; and
at least one non-transitory memory storing instructions, which, when executed by the at least one hardware processor, cause the system to:
- receive a user input to define a plurality of geographic zones that each include computer-readable data representing a corresponding physical geographic area, wherein multiple, non-ordered physical geographic areas are represented by the plurality of geographic zones;
- access localized media experiences that each include media data configured for output to a computing device associated with a user;
- link a different set of the localized media experiences to each of the plurality of geographic zones,
  - wherein at least one of the different sets of localized media experiences comprises a plurality of localized media experiences,
  - wherein each different set of localized media experiences is linked, by a record in a database, to a unique identifier of a corresponding beacon that is configured with processing circuitry and uniquely associated with a corresponding one of the plurality of geographic zones, and
  - wherein one or more localized media experiences in the different set of localized media experiences are accessible by the computing device associated with the user based on proximity between the computing device and the corresponding beacon and based on the unique identifier of the corresponding beacon; and
- define, for each of the plurality of geographic zones, a respective criterion by which a specific localized media experience in the different set of localized media experiences linked to the geographic zone is selected for provision to the user when the user is located within the physical geographic area corresponding to the geographic zone,
  - wherein the respective criterion is defined by:
    (1) identifying media data associated with one or more different localized media experiences in the different set of localized media experiences that were previously accessed by the user,
    (2) determining one or more interests of the user using the identified media data associated with the one or more different localized media experiences, and
    (3) determining, for at least one localized media experience in the different set of localized media experiences, a degree of similarity between the one or more interests of the user and the at least one localized media experience.

18. The system of claim 17, wherein a criterion associated with a first one of the geographic zones comprises a degree of match between one or more interests of the user and an attribute of a localized media experience in the different set of localized media experiences linked to the first geographic zone.

19. The system of claim 17, wherein a criterion associated with a first one of the geographic zones comprises an indication that the user has not previously received a selected one of the localized media experiences in the different set of localized media experiences linked to the first geographic zone.

20. The system of claim 17, wherein a criterion associated with a first one of the geographic zones comprises an identification of a second one of the geographic zones and specifies:
- a first localized media experience in the different set of localized media experiences linked to the first geographic zone is to be selected for provision to the user when location history associated with the user indicates that the user has previously been located within the physical geographic area corresponding to the second geographic zone; and
- a second localized media experience in the different set of localized media experiences linked to the first geographic zone is to be selected for provision to the user when location history associated with the user indicates that the user has not previously been located within the physical geographic area corresponding to the second geographic zone.

* * * * *